(12) United States Patent
Ziarno et al.

(10) Patent No.: US 7,620,374 B2
(45) Date of Patent: Nov. 17, 2009

(54) SYSTEM AND METHOD OF TRANSMITTING DATA FROM AN AIRCRAFT

(75) Inventors: James J. Ziarno, Malabar, FL (US); Shawn Gallagher, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 102 days.

(21) Appl. No.: 10/942,630

(22) Filed: Sep. 16, 2004

(65) Prior Publication Data

US 2006/0057974 A1    Mar. 16, 2006

(51) Int. Cl.
  *H04B 1/034*   (2006.01)
(52) U.S. Cl. .................. 455/98; 455/431; 455/558
(58) Field of Classification Search .......... 455/427, 455/430, 431, 556.1, 558, 98, 41.1, 91; 701/3, 701/14, 24, 29, 33, 35; 340/945, 973
See application file for complete search history.

(56) References Cited

U.S. PATENT DOCUMENTS

| | | | |
|---|---|---|---|
| 4,642,775 A | 2/1987 | Cline et al. ............ 364/443 |
| 4,675,675 A | 6/1987 | Corwin et al. ............ 340/945 |
| 4,729,102 A | 3/1988 | Miller, Jr. et al. ............ 364/424 |
| 4,872,182 A | 10/1989 | McRae et al. ............ 375/1 |
| 4,943,919 A | 7/1990 | Aslin et al. ............ 364/424.03 |
| 5,022,024 A | 6/1991 | Paneth et al. ............ 370/50 |
| 5,233,626 A | 8/1993 | Ames ............ 375/1 |
| 5,339,330 A | 8/1994 | Mallinckrodt ............ 375/1 |
| 5,351,194 A | 9/1994 | Ross et al. ............ 455/456 |
| 5,359,446 A | 10/1994 | Johnson et al. ............ 359/152 |
| 5,445,347 A | 8/1995 | Ng ............ 236/169 |
| 5,459,469 A | 10/1995 | Schuchman et al. ............ 342/37 |
| 5,463,656 A | 10/1995 | Polivka et al. ............ 375/200 |
| 5,652,717 A | 7/1997 | Miller et al. ............ 703/6 |
| 5,757,772 A | 5/1998 | Thornberg et al. ............ 370/236 |
| 5,761,625 A | 6/1998 | Honcik et al. ............ 701/14 |
| 5,943,399 A | 8/1999 | Bannister et al. ............ 455/414 |
| 5,978,862 A * | 11/1999 | Kou et al. ............ 710/14 |
| 6,047,165 A | 4/2000 | Wright et al. ............ 455/66 |
| 6,097,343 A * | 8/2000 | Goetz et al. ............ 343/708 |
| 6,098,133 A | 8/2000 | Summers et al. ............ 710/107 |
| 6,104,914 A | 8/2000 | Wright et al. ............ 455/66 |
| 6,108,523 A | 8/2000 | Wright et al. ............ 455/66 |

(Continued)

FOREIGN PATENT DOCUMENTS

EP    0 407 179 A1    7/1990

(Continued)

OTHER PUBLICATIONS

Gate-Aircraft Terminal Environment Link (Gatelink)—Ground Side, ARINC Specification 632, Dec. 30, 1994.

(Continued)

*Primary Examiner*—Patrick N Edouard
*Assistant Examiner*—Anthony S Addy
(74) *Attorney, Agent, or Firm*—Allen, Dyer, Doppelt, Milbrath & Gilchrist, P.A.

(57) ABSTRACT

A system and method of transmitting data from an aircraft includes a PC card that acquires aircraft data and transmits the aircraft data over a radio frequency communications signal into the skin of the aircraft, which radiates the radio frequency communications signal to a location remote from the aircraft.

23 Claims, 11 Drawing Sheets

U.S. PATENT DOCUMENTS

| | | | |
|---|---|---|---|
| 6,148,179 A | 11/2000 | Wright et al. | 455/66 |
| 6,154,636 A | 11/2000 | Wright et al. | 455/66 |
| 6,154,637 A | 11/2000 | Wright et al. | 455/66 |
| 6,160,998 A | 12/2000 | Wright et al. | 455/66 |
| 6,163,681 A | 12/2000 | Wright et al. | 455/66 |
| 6,167,238 A | 12/2000 | Wright | 455/66 |
| 6,167,239 A | 12/2000 | Wright et al. | 455/66 |
| 6,173,159 B1 | 1/2001 | Wright et al. | 455/66 |
| 6,181,990 B1 * | 1/2001 | Grabowsky et al. | 701/14 |
| 6,198,445 B1 * | 3/2001 | Alt et al. | 343/705 |
| 6,278,913 B1 * | 8/2001 | Jiang | 701/3 |
| 6,308,044 B1 | 10/2001 | Wright et al. | 455/66 |
| 6,308,045 B1 | 10/2001 | Wright et al. | 455/66 |
| 6,353,734 B1 | 3/2002 | Wright et al. | 455/98 |
| 6,393,281 B1 | 5/2002 | Capone et al. | 455/428 |
| 6,522,867 B1 | 2/2003 | Wright et al. | 455/66 |
| 6,577,500 B2 * | 6/2003 | Paredes et al. | 361/686 |
| 6,745,010 B2 | 6/2004 | Wright et al. | 455/66.1 |
| 2005/0200526 A1 * | 9/2005 | Crain et al. | 343/700 MS |
| 2005/0228558 A1 * | 10/2005 | Valette et al. | 701/33 |
| 2005/0228559 A1 * | 10/2005 | Bloch et al. | 701/33 |
| 2008/0039076 A1 * | 2/2008 | Ziarno et al. | 455/431 |

FOREIGN PATENT DOCUMENTS

| | | |
|---|---|---|
| GB | 2 276 006 A1 | 9/1994 |

OTHER PUBLICATIONS

Airlines Electronic Engineering Committee Letter 91-079/DLK-391, Apr. 5, 1991.

Gate-Aircraft Terminal Environment Link (Gatelink)—Aircraft Side, ARINC Characteristic 751, Jan. 1, 1994.

Aviation Week & Space Technology, "*Safety Board Urges Mandatory Use of FDR/CVRs in Commuter Transports,*" Avionics, p. 73, McGraw-Hill, Inc., Aug. 31, 1987.

Aviation Week & Space Technology, "*Conversion Approach Appears Flawed,*" Aerospace Business, vol. 139, No. 4, p. 48, McGraw-Hill, Inc., Jul. 31, 1993.

Electronic Engineering Times, "*Module is Result of Work With Apple—Plessey Makes Leap With Wireless LAN,*" Nov. 7, 1994.

W.R. Beckman, "*L-1011 Flight Data Recording Systems—Background, Features, Implications and Benefits,*" AIAA Aircraft Systems and Technology Conference, Los Angeles, California, Aug. 21-23, 1978, 9 pages (Exhibit 8).

Arinc Characteristic 591, "*Quick Access Recorder For AIDS System (QAR),*" Airlines Electronic Engineering Committee, Aeronautical Radio, Inc., May 18, 1972, 21 pages (Exhibit 9).

"Wired Datalink for the Parked Airplane," Paper Presented at AEEC Data Link Subcommittee Meeting, May 16, 1989, 10 pages.

Mini QAR (Quick-Access Recorder), Avionics Test Solutions brochure, published by Avionica, 1996, 3 pages.

Future Concepts for Maintenance, Report of the Portable Maintenance Access Terminal (PMAT) Working Group Meeting, ARINC, 94-205/FCM-69, Sep. 1, 1994, 38 pages.

"McGraw-Hill Illustrated Telecom Dictionary," Jade Clayton, 1998, pp. 390, 391.

Office Action in Ex Parte Reexamination mailed Dec. 19, 2007; U.S. Patent and Trademark Office, U.S. Appl. No. 90/008,567, filed Mar. 30, 2007; 21 pages.

* cited by examiner

SYSTEM AND METHOD OF TRANSMITTING DATA FROM AN AIRCRAFT

FIELD OF THE INVENTION

The present invention relates to communication systems, and more particularly, the present invention relates to a system and method of transmitting data from an aircraft.

BACKGROUND OF THE INVENTION

A Digital Acquisition Unit (DAU), also known by some skilled in the art as a DFDAU, receives signals from many on-board aircraft systems. The DAU processes the data as Flight Operations Quality Assurance (FOQA) data, which is recovered from the aircraft by different prior art techniques. For example, a PCMCIA card may connect into an auxiliary PCMCIA slot of the Data Acquisition Unit and record data into a flash memory of the card. Once the data is collected into flash memory, airline operators manually replace the PCMCIA cards with a new card and retrieve the aircraft data from the flash memory of the old card.

Other prior art techniques for collecting this aircraft data include wireless systems, which often require costly aircraft modifications. For example, a separate unit to record data, such as a ground data link unit, is required, and an additional aircraft antenna must be mounted on the fuselage. Often aircraft wiring changes are made. These ground data link units require a data processor, a data collection circuit, a wireless LAN radio, a power amplifier, and external fuselage antenna. Multiple line receiver units are also often required adding to the significant investment made by an aircraft operator.

Examples of a ground data link systems that have been used in an aircraft are disclosed in commonly assigned U.S. Pat. Nos. 6,047,165; 6,104,914; 6,108,523; 6,148,179; 6,154,636; 6,154,637; 6,160,998; 6,163,681; 6,167,238; 6,167,239; 6,173,159; 6,308,044; 6,308,045; 6,353,734; 6,522,867; and 6,745,010, the disclosures which are hereby incorporated by reference in their entirety.

It would be desirable, however, to extract Flight Operations Quality Assurance data or other aircraft data from an aircraft component, such as a DAU, in a less complicated and costly system, rather than using a ground data link unit or manually replacing flash memory PCMCIA cards.

SUMMARY OF THE INVENTION

The present invention advantageously provides a turn-key solution in a removable PC card, which includes a storage memory, control logic circuitry, a processor, and a radio transceiver for transmitting aircraft data along a radio frequency signal. In one aspect of the present invention, the skin of the aircraft receives the radio frequency signal and radiates the radio frequency signal to a location remote from the aircraft, for example, access points of a local area network. The transmitter is preferably operative in accordance with 802.11 standards in which aircraft data is transmitted over a spread spectrum communications signal, such as a frequency hopping spread spectrum communications signal or a direct sequence spread spectrum communications signal.

The data can be transmitted to a Central Maintenance Display Unit (CMDU), indicating in real-time the health and status of aircraft systems. The data can be flight performance data, such as Flight Operations Quality Assurance (FOQA) data from the DAU, aircraft engine data, in-flight entertainment data, or aircraft data relating to aircraft contents, passenger data, aircraft departure and arrival, passenger transactions, or a sky marshall. The PC card preferably is formed as a PCMCIA card with a desired form factor, for example, a Type III PCMCIA card.

In one aspect of the present invention, the PC card includes a PC card interface adapted for connecting to an aircraft component, such as the DAU. A memory stores aircraft data received from the aircraft component. A radio transmitter receives the aircraft data from the memory and transmits the aircraft data over a radio frequency signal. A processor is operatively connected to the PC card interface, memory and radio transmitter for reading and forwarding data from the memory to the radio transmitter. A logic circuit is operative with the memory, processor and PC card interface for controlling the downloading of data from the aircraft component to the memory and the reading and the forwarding of data from the memory to the radio transmitter without conflict between the processor and aircraft component.

In one aspect of the present invention, the logic circuit comprises a field programmable gate array. The PC card body preferably has a PCMCIA form factor. The transmitter preferably comprises a spread spectrum transmitter for transmitting aircraft data over a spread spectrum communications signal, which could be a frequency hopping or direct sequence spread spectrum communications signal. The PC card can also include a receiver as part of a transceiver that receives data for on-board processing. This type of received data could comprise at least data for specifying one of the power limits, frequency or type of aircraft data to be transmitted.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

Figure 1:
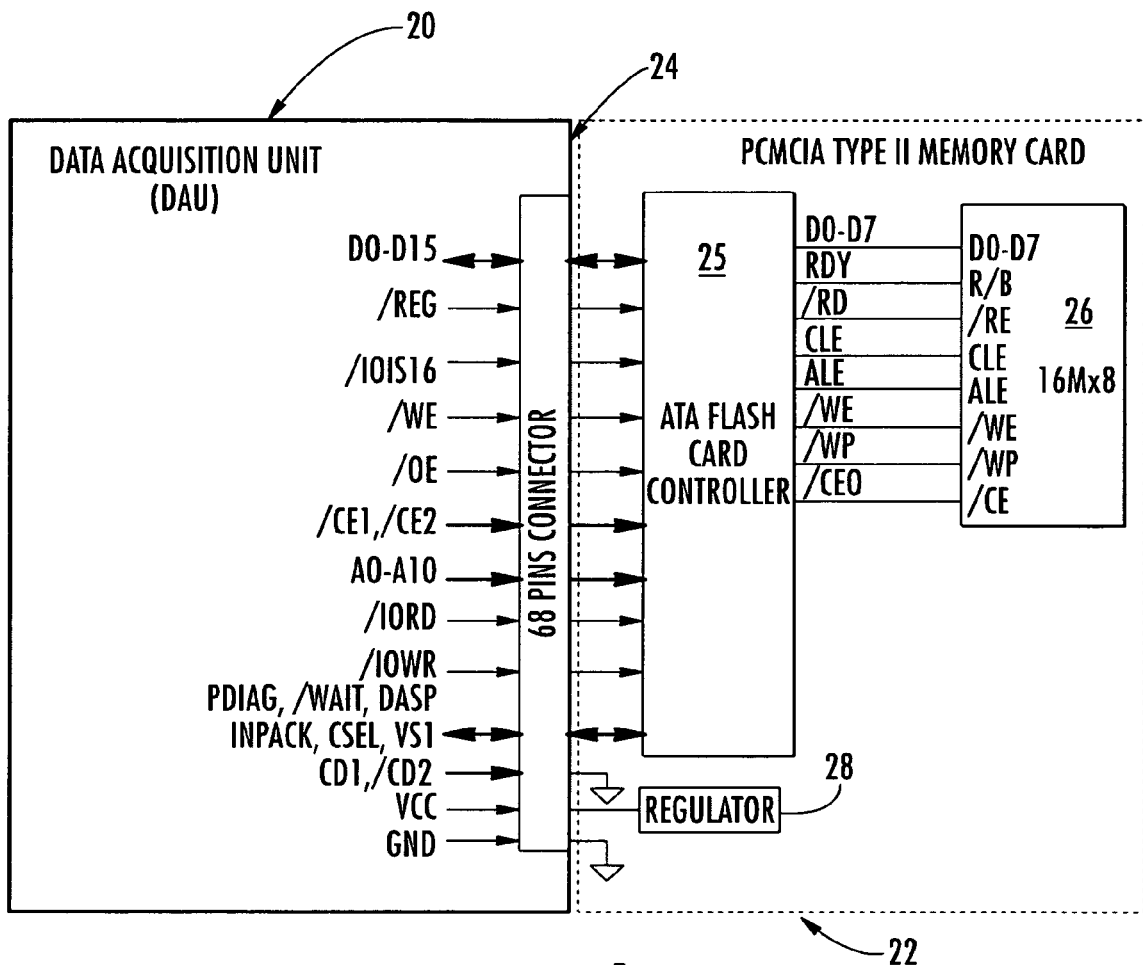
FIG. 1 is a block diagram showing an aircraft Data Acquisition Unit and a prior art PCMCIA Type II memory card interfaced with the Data Acquisition Unit, and showing the different inputs from the Data Acquisition Unit into the PCMCIA memory card.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

The present invention automatically and without manual intervention allows Flight Operations Quality Assurance (FOQA) or other aircraft data to be extracted from an aircraft component, such as the Digital Acquisition Unit (DAU), into a PC card, without requiring airline operators to manually replace the PC cards to obtain the FOQA data, as in many prior art systems. The present invention is also advantageous over prior art wireless systems, which normally require costly aircraft modification, including the use of a separate unit to record aircraft data, an external aircraft antenna mounted on the fuselage, and aircraft wiring changes.

The present invention uses a single PC card, for example, a PC card operable in accordance with the Personal Computer Memory Card International Association (PCMCIA). The present invention uses the passive radiation coupling of a radio frequency communications signal into the skin of the fuselage, which radiates, i.e., re-radiates the radio frequency communications signal received from the PC card, which had radiated the signal from its antenna, and eliminates the necessity for adding an additional, external aircraft antenna mounted on the fuselage.

Prior art systems include the use of a flash memory PCMCIA card, or an integrated system such as the ground data link systems disclosed in the above-identified, commonly assigned, and incorporated by reference patents. The ground data link system disclosed in those patents sometimes require multiple Local Receiver Units (LRU's) and a data collection unit having a central processing unit, a wireless local area network (LAN) radio, a power amplifier, and an external fuselage antenna.

The ground data link unit as disclosed in the above-identified and incorporated by reference patents operates with the ARINC 763 system, and is connected into the Data Acquisition Unit (DAU) (also known as the DFDAU), typically through the optional auxiliary output using an ARINC 429 link.

The Digital Access Unit system typically includes a separate central processing unit (CPU) for a mandatory portion or segment that connects by a ARINC 717 link to the Digital Flight Data Recorder (DFDR). The DAU receives sensor information from the aircraft engines, flaps, electronics and numerous other aircraft systems, sometimes as many as 2,000 different systems in large commercial aircraft. An optional portion of the DAU typically includes a separate CPU and an optional/auxiliary output, for example, formed as a PCMCIA slot. The prior art multiple-LARU approach using an external fuselage antenna and a ground data link unit, or similar devices, typically required expensive equipment acquisition and aircraft modifications. This often required that the aircraft be out-of-service to place the system in operation. Also, sometimes FAA certification was required, which took time after or before installation.

Although some prior art systems include a standard PCMCIA Type II memory card interfaced to the DAU, the card still had to be manually removed for data retrieval. Other prior art systems used quick access recorders having optical/magnetic media, which had to be removed for data retrieval.

The present invention allows aircraft operators to extract aircraft data, such as Flight Operations Quality Assurance (FOQA) data, from the aircraft while minimizing their costs of such retrieval.

The present invention uses a removable PC card, such as a PCMCIA card, with a flash storage memory circuit, control logic circuitry, a processor, wide local area network (WLAN) radio drivers, and a complete 802.11 WLAN transceiver that transmits the aircraft data and receives data for on-board processing. The use of a PC card reduces cost to the aircraft operator without requiring the aircraft to be out-of-service while a system is installed. No external antenna is required because the aircraft skin and fuselage acts as a passive radiator, in accordance with the present invention, to transmit or receive data from the aircraft. This can optimize transmission from the aircraft and reduce internal aircraft multipath attenuation.

FIG. 1 illustrates a conventional Digital Acquisition Unit (DAU) 20 and a PC card designed as a PCMCIA flash memory card 22 connected into the optional PCMCIA connector 24 of the DAU, which interfaces an auxiliary ARINC 429 link. This prior art PCMCIA memory card 22 was typically a Type II memory card, and included an ATA flash card controller 25 that connected into a flash memory 26, and a regulator circuit 28. The ATA standard is an AT attachment for a preferred IDE drive interface on a PC card. The PCMCIA connector 24 on the DAU 20 is formed as a 68-pin connector that connects to the PCMCIA Type II memory card 22 as shown in FIG. 1. The memory card typically has about 256 megabytes of storage and a thickness of about 5 mm. FIG. 1 also shows the various functions and data that can be extracted from the DAU and input into the ATA flashcard controller 25. FIG. 1 also shows the different connections to the flash memory 26 from the ATA flashcard controller 25. The chart below shows the pinouts and pin identification.

| Pinouts | |
|---|---|
| Pin No. | Pin Name |
| 01 | GND |
| 02 | D3 |
| 03 | D4 |
| 04 | D5 |
| 05 | D6 |
| 06 | D7 |
| 07 | /CE1 |
| 08 | A10 |

-continued

Pinouts

| Pin No. | Pin Name |
|---|---|
| 09 | /OE |
| 10 | RFU |
| 11 | A9 |
| 12 | A8 |
| 13 | RFU |
| 14 | RFU |
| 15 | /WE |
| 16 | /IRQ |
| 17 | VCC |
| 18 | RFU |
| 19 | RFU |
| 20 | RFU |
| 21 | RFU |
| 22 | A7 |
| 23 | A6 |
| 24 | A5 |
| 25 | A4 |
| 26 | A3 |
| 27 | A2 |
| 28 | A1 |
| 29 | A0 |
| 30 | D0 |
| 31 | D1 |
| 32 | D2 |
| 33 | /IO16 |
| 34 | GND |
| 35 | GND |
| 36 | /CD1 |
| 37 | D11 |
| 38 | D12 |
| 39 | D13 |
| 40 | D14 |
| 41 | D15 |
| 42 | /CE2 |
| 43 | VS1 |
| 44 | /IORD |
| 45 | /IOWR |
| 46 | RFU |
| 47 | RFU |
| 48 | RFU |
| 49 | RFU |
| 50 | RFU |
| 51 | VCC |
| 52 | RFU |
| 53 | RFU |
| 54 | RFU |
| 55 | RFU |
| 56 | CSEL |
| 57 | RFU |
| 58 | RST |
| 59 | /WAIT |
| 60 | INPACK |
| 61 | /REG |
| 62 | DASP |
| 63 | PDIAG |
| 64 | D8 |
| 65 | D9 |
| 66 | D10 |
| 67 | /CD2 |
| 68 | GND |

Pin Identification

| Symbol | Function |
|---|---|
| D0-D15 | Data Bus (bidirectional) |
| A0-A10 | Address Bus (input) |
| /CE1, /CE2 | Card Enable (input) |
| /OE, /WE | Output/Write Enable (input) |
| /REG | Register Select (input) |
| /IORD, /IOWR | I/O Access (input) |
| /CD1, /CD2 | Card Detect (output) |
| /IRQ, /IO16, RST, /WAIT, DASP, CSEL, PDIAG, INPACK | I/O Handshaking (input/output) |
| RFU | Reserved for Future Use |
| VCC | +5 V or +3.3 V power input |

Figure 2:
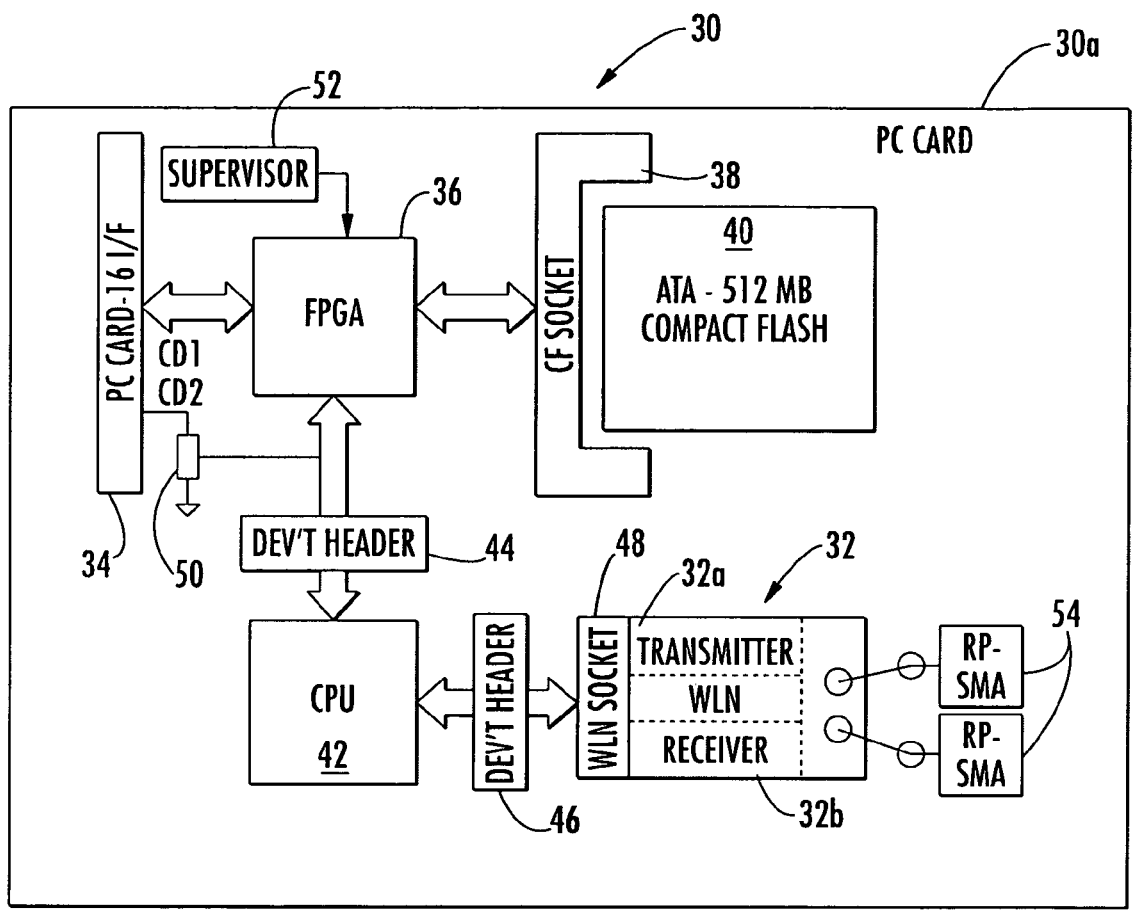
FIG. 2 is a block diagram of the PC card of the present invention, which interfaces with an aircraft component, such as a Digital Acquisition Unit, and showing a processor, logic circuit, memory and transceiver.
Figures 3A, 3B, 3C:
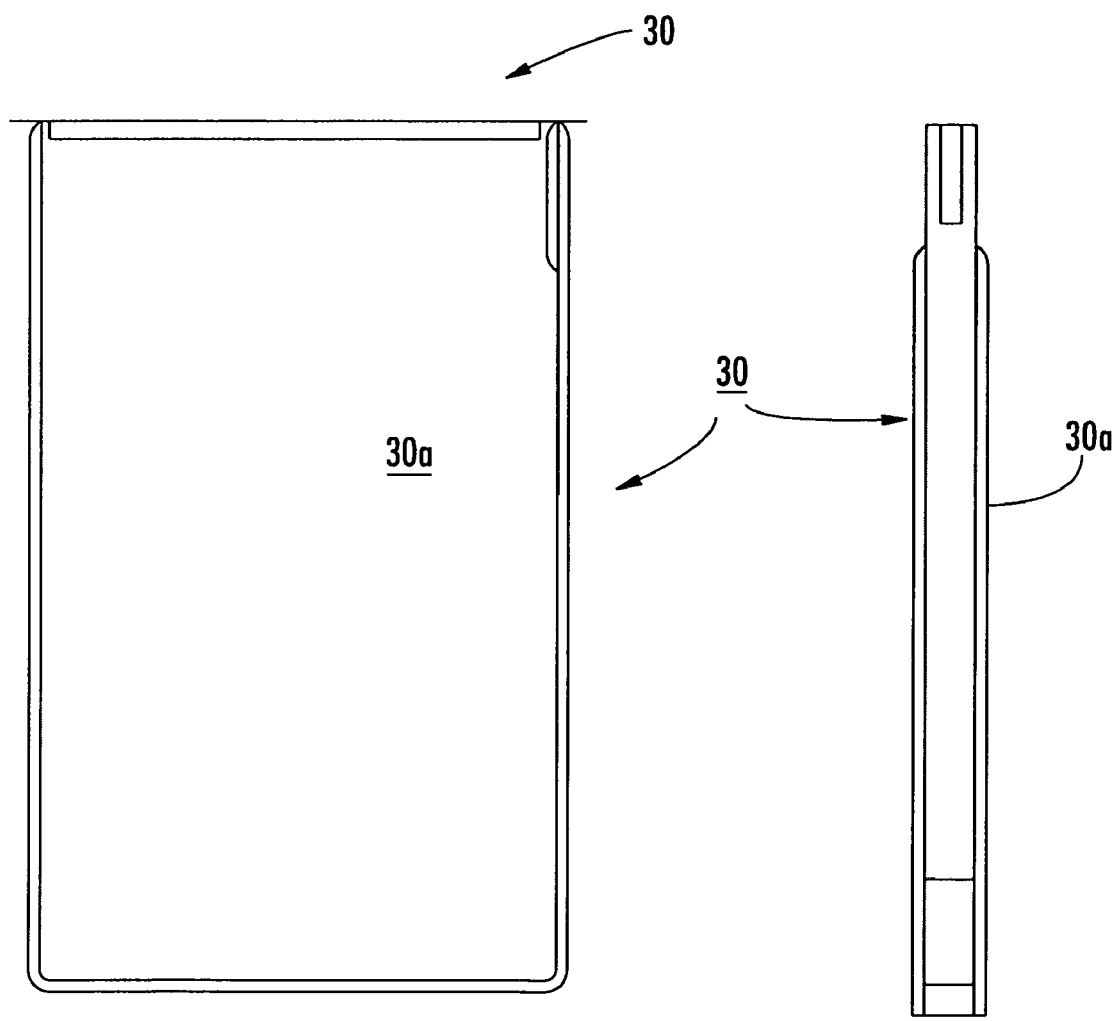
FIGS. 3A, 3B and 3C are respective front elevation, top plan and side elevation views of the PC card of the present invention in a desired Type III PCMCIA form factor.

FIG. 2 is a block diagram of the PC card 30 of the present invention, which includes a wireless transceiver 32 for transmitting aircraft data, including Flight Operations Quality Assurance (FOQA) data, and receiving data for on-board processing. The transceiver 32 includes respective transmitter and receiver sections 32a, 32b. FIGS. 3A, 3B and 3C show one form factor for the PC card 30 of the present invention. The PC card includes a body 30a formed as a PCMCIA Type III memory card, which is about 10.5 mm thick and sufficiently large enough to hold the additional circuitry, logic circuits, controller (or processor), and transceiver used in the PC card of the present invention.

As illustrated in FIG. 2, the PC card 30 of the present invention includes a PC card-16 I/F interface circuit 34. A Field Programmable Gate Array (FPGA) 36 circuit acts as logic circuitry to interface a CF socket 38, the ATA 512 megabyte compact flash memory 40, and the interface circuit 34. The PC card 30 of the present invention includes a central processing unit or processor 42, which interfaces through a development header circuit 44 with the field programmable gate array 36 and through another development header circuit 46 to the wireless local area network radio transceiver 32 via a radio socket circuit 48.

A communication circuit 50 C01/C02 interfaces between the PC card interface 34 and the data/communications bus on the development header interface 44 between the central processing unit 42 and the field programmable gate array 36. A supervisor circuit 52 is operable with the field programmable gate array 36 as a logic circuit and monitors the PC card operation and its interface with the DAU 20 for controlling the downloading of data from an aircraft component to the memory, and the reading and forwarding of the aircraft data from the memory to the radio transmitter section 32a of the radio transceiver 32 without conflict between the processor and the aircraft component. The supervisor circuit 52 and FPGA 36 permit the disconnection of the CPU 42 in the PC card, and allows the CPU in the DAU 20 to control data extraction from the DAU into the ATA-512 megabyte compact flash memory 40 of the PC card 30. The supervisor 52 and FPGA 36 allows the CPU 42 to read aircraft data from the compact flash memory 26 and forward the aircraft data to the transceiver 32, where the transmitter section 32a of the transceiver wirelessly transmits the aircraft data as a radio frequency communications signal into the skin of the aircraft, which reradiates the radio frequency communications signal to a location remote from the aircraft.

The PC card 30 can include two antenna connections, RP-SMA 54, allowing connection of the transceiver to small linear or other antennas about one or two inches long. Preferably, a conformal antenna would be used, conforming in design to the illustrated Type III PCMCIA card, as one non-limiting example. It should be understood that other form factors can be used in the present invention besides the PCMCIA Type III form factor. The transceiver 32 also includes a receiver circuit 32b, which is operative to receive data for specifying one of the power limits, frequency or type of aircraft data.

In a preferred aspect of the present invention, the WLAN wireless transceiver 32 is operable to transmit aircraft data over a spread spectrum communications signal, such as a frequency hopping or direct sequence spread spectrum communications signal. Preferably the transceiver 32 transfers the aircraft data over a radio frequency signal that is in accordance with 802.11 family of specifications for wireless LAN technology and, in one aspect of the present invention, in accordance with 802.11(b), high rate or the Wi-Fi standard, which applies to wireless LAN's and provides 11 Mbps transmission with a fallback to 5.5, 2 and 1 Mbps in the 2.4 GHz band.

Preferably only a direct sequence spread spectrum communications signal is used, but frequency hopping spread spectrum communications systems can be used in other embodiments, as well as other spread spectrum systems, including modified chirp and similar systems. The present invention also allows wireless functionality, comparable to Ethernet. It should be understood, however, that besides 802.11(b) protocol, other 802.11 or other communication protocols, including different types of complementary code keying (CCK) used with direct sequence spread spectrum technology can be used. The system could include Wired Equivalent Privacy (WEP) by encrypting data and Wi-Fi Protected Access (WPA), which improves security features of the Wired Equivalent Privacy. The system can include improved data encryption through a Temporal Key Integrity Protocol (TKIP), which scrambles the keys using a hashing algorithm and uses an integrity-checking feature. The system can have user authentication through an Extensible Authentication Protocol (EAP), which together with WEP, regulates access to a wireless network based on a computer-hardware specific Media Access Controller (MAC) address. EAP can be built on a secure public key encryption system to ensure only authorized network users access any local area or other network that receives the aircraft data. Other types of frequency-shift keying or phase-shift keying methods can be used for the present invention.

Figure 4:
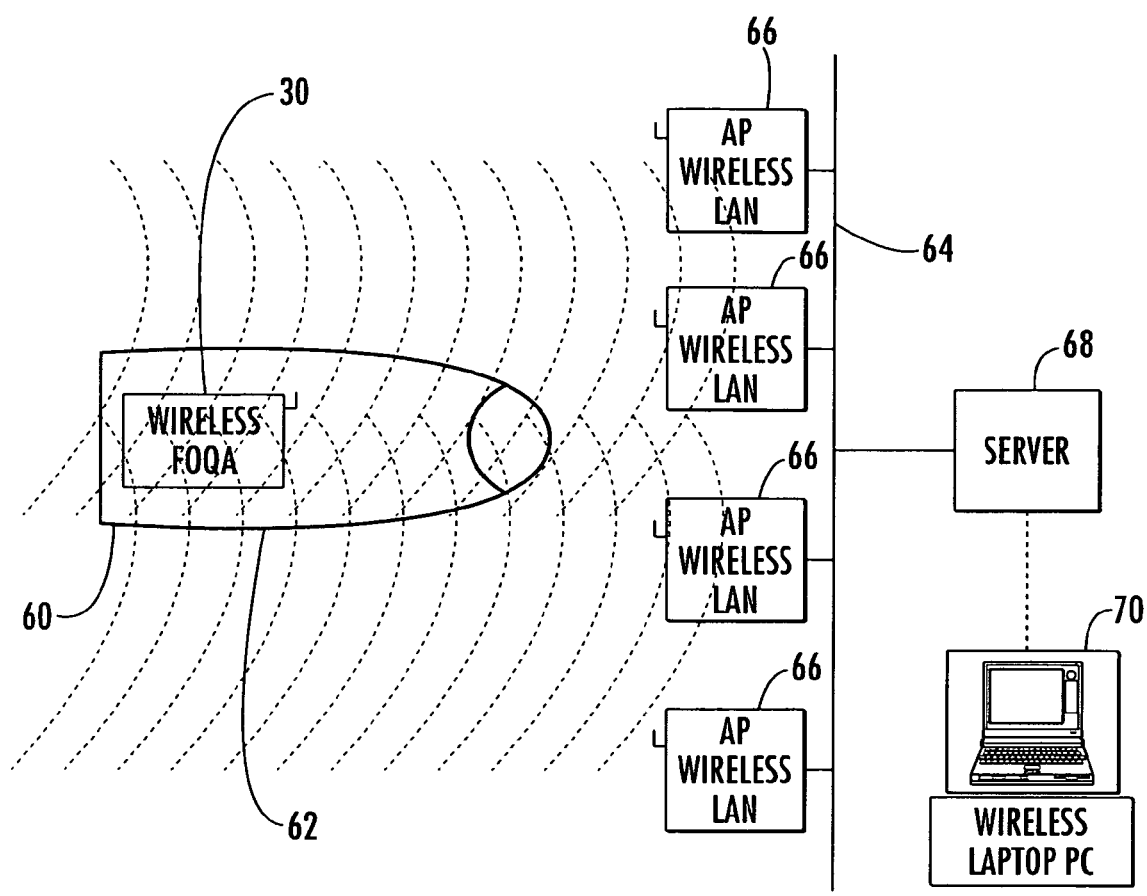
FIG. 4 is a fragmentary, partial block diagram of an aircraft having the PC card of the present invention connected into an aircraft component, and wirelessly transmitting aircraft data along a radio frequency communications signals into the skin of the aircraft, which radiates the radio frequency communications signals to a wireless local area network (LAN) access point (AP) to be processed at a server and processor.

FIG. 4 shows an aircraft 60 with the wireless PC card 30 of the present invention incorporated with the DAU 20. The PC card 30 transmits aircraft data along a radio frequency communications signal into the skin 62 of the aircraft fuselage, which radiates the radio frequency communications signal to a location remote from the aircraft. In the present illustrated example shown in FIG. 4, the signal is transmitted to a wireless local area network having multiple access points 66 acting as receivers that connect into a server 68, for example, a baggage server, and into a processor 70, for example, a wireless laptop PC, which allows processing of the aircraft data that is received from the aircraft. For example, the aircraft data could be data relating to what luggage is stored in the aircraft. That luggage data is transmitted to the DAU 20 or another aircraft component. The PC card 30 of the present invention extracts the aircraft data and stores it in memory 40. The CPU 42 reads the aircraft data from the PC card memory 40, forwards the aircraft data to the transceiver 32, which transmits the aircraft data to the skin of the aircraft. The radio frequency communications signal is reradiated (or radiated) from the aircraft skin as a passive antenna to receivers on the ground as access points of the local area network.

Because the PC card 30 of the present invention has a receiver 32b as part of its transceiver 32 function, data can be uploaded, including control signals for specifying which portions of data are to be retrieved from the aircraft component and transmitted. Also, because the PC card of the present invention has a desired form factor, for example, a Type III PCMCIA form factor, the PC card can be connected into other PC card slots for different aircraft components, including PC card slots that may be positioned on the aircraft engine, in the cockpit, in the cargo compartment, or in the main passenger seating area.

Figure 5:
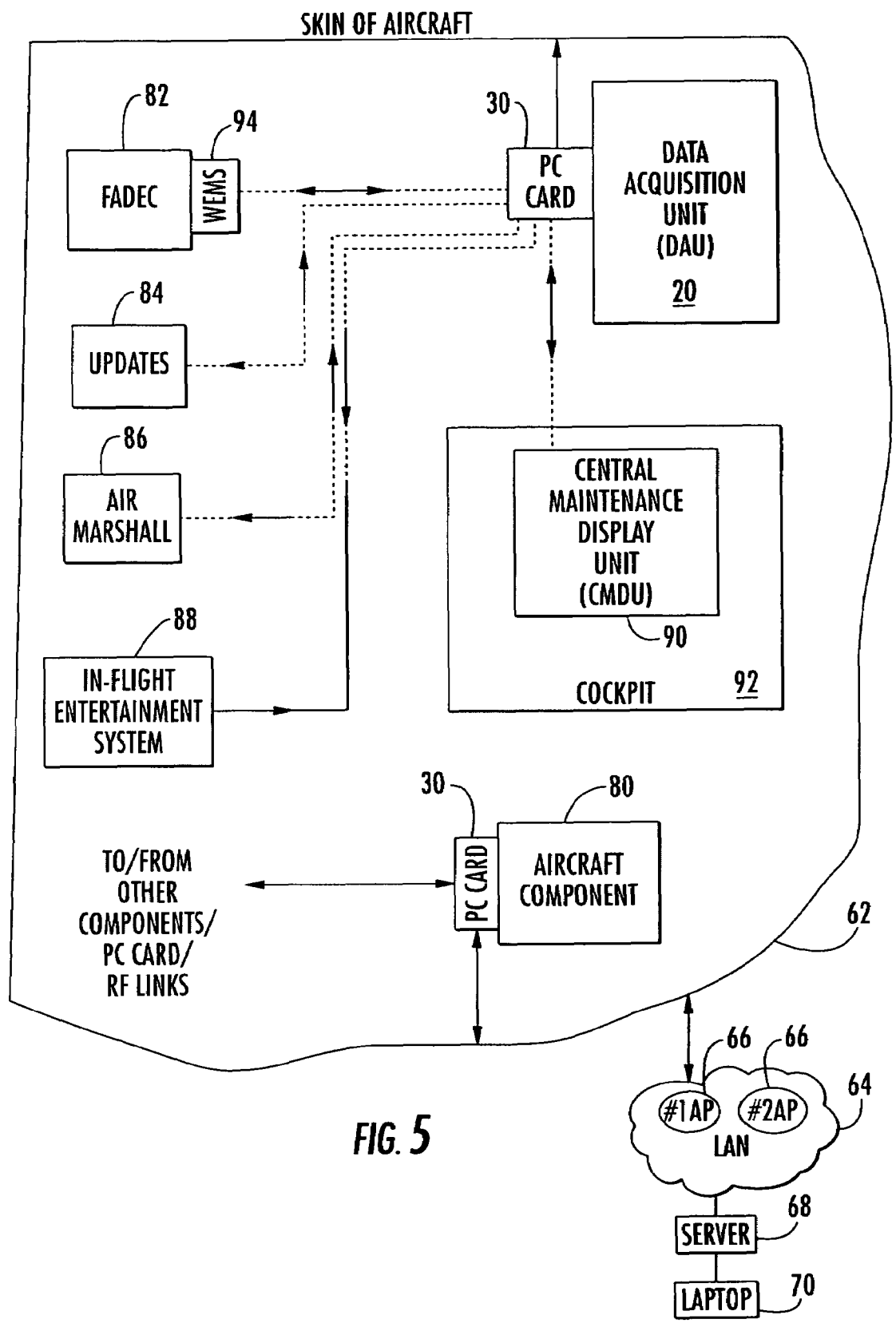
FIG. 5 is a block diagram showing various aircraft components that can be interfaced with the PC card of the present invention.

FIG. 5 shows different aircraft components. For example, the DAU 20, and a second aircraft component 80, both receive the PC card 30 of the present invention. Data could be retrieved from a FADEC 82, software updates 84, an air marshall 86, or in-flight entertainment system 88 using the PC card of the present invention, depending on which aircraft component it is coupled. Signals could be received from an air marshall 86 who is stationed on an international or other domestic flight, and later transmitted to the ground or directly to the cockpit using the PC card of the present invention, for example, interfaced to the ADU or other aircraft component. Aircraft data could also be transmitted to a Central Maintenance Display Unit (CMDU) 90 that indicates in real-time the health and status of aircraft systems. The CMDU 90 could be located in the cockpit 92 to allow the pilot to view real-time health and status data.

The aircraft data could also comprise flight performance data or aircraft engine data received from a WEMS module 94 mounted on the FADEC 82. An example of a WEMS module is disclosed in commonly assigned U.S. patent application Ser. No. 10/774,578, filed Feb. 9, 2004, entitled "Wireless Engine Monitoring System," the disclosure which is hereby incorporated by reference in its entirety. Also, the aircraft data could be related to at least one of aircraft contents, passenger data, aircraft departure and arrival, or passenger transactions. Aircraft data could also be received from a hand-held unit, such as disclosed in the incorporated by reference '010 patent. Data can be transmitted to the flight deck if applicable.

It should be understood that the PC card 30 of the present invention can have other functions because it includes a transceiver for receiving data for on-board processing. This received data could be instructions for varying the power or frequency of a transmission. Also, various audio, video and navigation files could be uploaded and transferred from the PC card into an aircraft component, for example, an in-flight entertainment file server or the DAU, and then into other aircraft systems.

The PC card of the present invention can also be operative for transmitting aircraft data at a first higher data rate when the aircraft is on the ground, and a second, substantially lower data rate when the aircraft is airborne in close proximity to an airport, for example, as disclosed in the above-identified and incorporated by reference '681 patent. It is also possible to transmit over a plurality of sub-band frequency channels where the frequency can be chosen based upon the position of the aircraft determined by an on-board global positioning system, as disclosed in the above-identified and incorporated by reference '238 patent. Flight management data can also be uploaded. The PC card 30 of the present invention could include the functions as disclosed in the incorporated by reference patents.

The PC card 30 of the present invention is also advantageous because it wirelessly transmits aircraft data from the aircraft without requiring an external antenna mounted on the fuselage. It has been found that the aircraft skin can be used as a passive radiator. As a result, it is possible to shorten the time and decrease the effort used in the recovery of aircraft data for off-site analysis. Experimental results have shown the advantages of this system and method.

Experiments were conducted showing the feasibility of using the aircraft skin by using an IEEE 802.11b wireless Local Area Network (LAN) card operating in a PC card slot of a laptop computer. The aircraft used was a Canadair CL-604 regional jet aircraft. The laptop for this test was placed in a rear equipment bay, which is outside of the pressure hull. It is vented to the atmosphere through a set of louvers on the belly of the aircraft. The laptop was set to run on its own battery power for the duration of the test. The importance of this fact is to note that there was no coupling of the electrical systems (DC or RF) of the aircraft and the laptop computer. The laptop was set to perform a "ping" operation continuously to provide a steady stream of packets for the Radio Frequency (RF) measurements.

Figure 6:
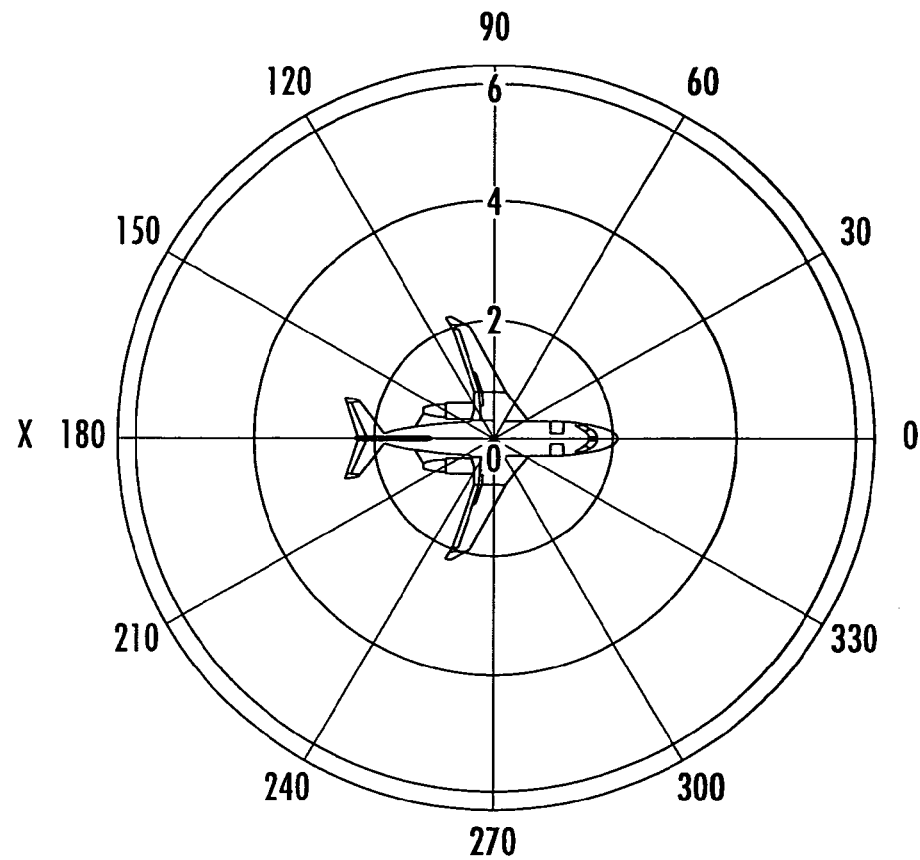
FIG. 6 is a graph showing a polar plot superimposed on a regional jet for a 20 meter radiated field test using the system of the present invention.
Figure 7:
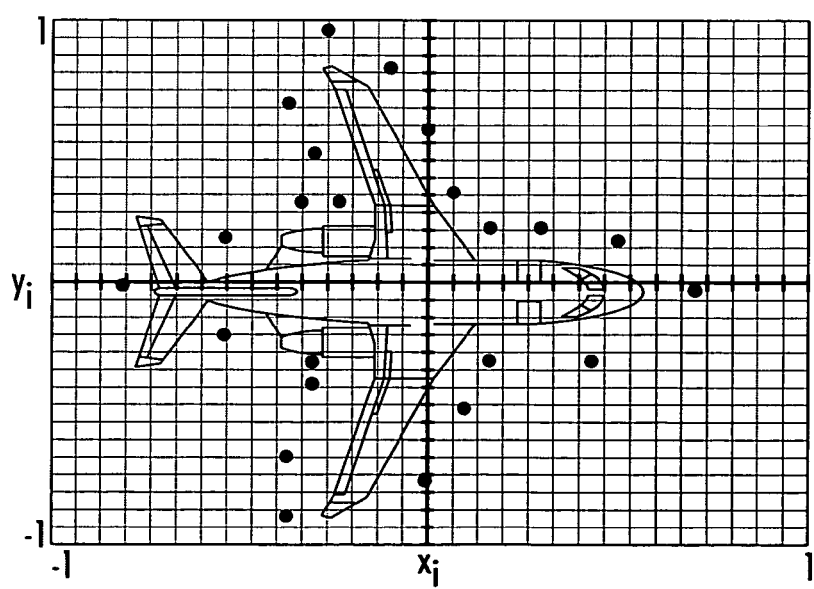
FIG. 7 is a graph showing a rectangular grid superimposed on the regional jet used for the close-in far field measurements using the system of the present invention.

The tests consisted of two parts. The first test was a series of measurements taken at a distance of 20 meters from the center of the aircraft (FIG. 6). The measurements were spaced 15 degrees apart with zero degrees centered on the nose of the aircraft. The second set of measurements was taken at a uniform distance of 2 meters from the closest approach to the skin of the aircraft and spaced 3 meters apart (FIG. 7).

The measurement equipment included an Agilent model 8563 EC spectrum analyzer connected through a 6 meter cable to a 2.4 GHz test antenna. The antenna was mounted on a nonconductive pole approximately 2 meters long. This height placed it at the outer bulge of the aircraft skin and above the level of local sources of multi-path and other unintentional re-radiators.

The first 20 meter test was intended to ascertain the far field pattern of radiation within the available tamp space of the airport while at a reasonably large distance from the aircraft. The second 2 meter test was intended to examine the close-in far field for point-like or line-like radiators which would contribute disproportionately to the far field pattern or conversely eliminate them as major contributors.

FIG. 6 is a polar plot superimposed on a CL-604 regional jet for the 20 meter radiated field test, and illustrates the geometry for the 20 meter data collection effort. The aircraft is approximately 21 meters long overall and 19½ meters wingtip-to-wingtip. Thus, the first measurement was, in general, 20 meters or more from the closest point of approach to the aircraft skin.

FIG. 7 illustrates the superposition of a rectangular grid over the outline of the CL-604 aircraft for close-in fair field measurements and the transposed data points collected to determine if any strong, point-source radiators existed to account for the far field radiation pattern. These measurements used the same data collection equipment as that used in the first test. Each circle represents one point of measurement.

Figure 8:
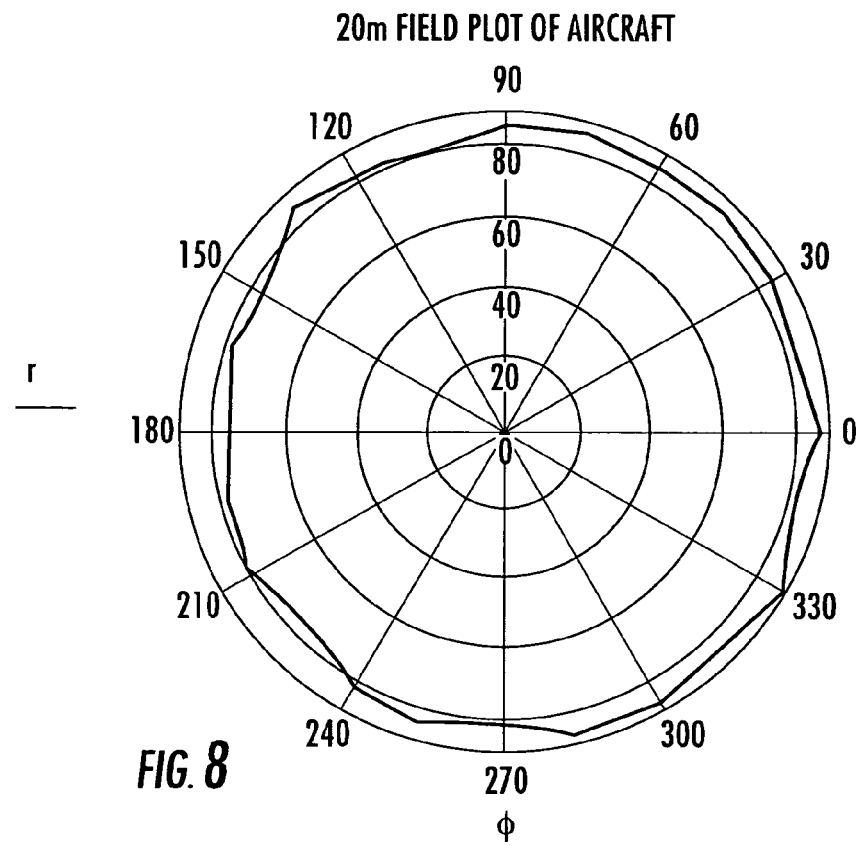
FIG. 8 is a graph showing a plot of the 20 meter radio frequency field readings using the system of the present invention.
Figure 9:
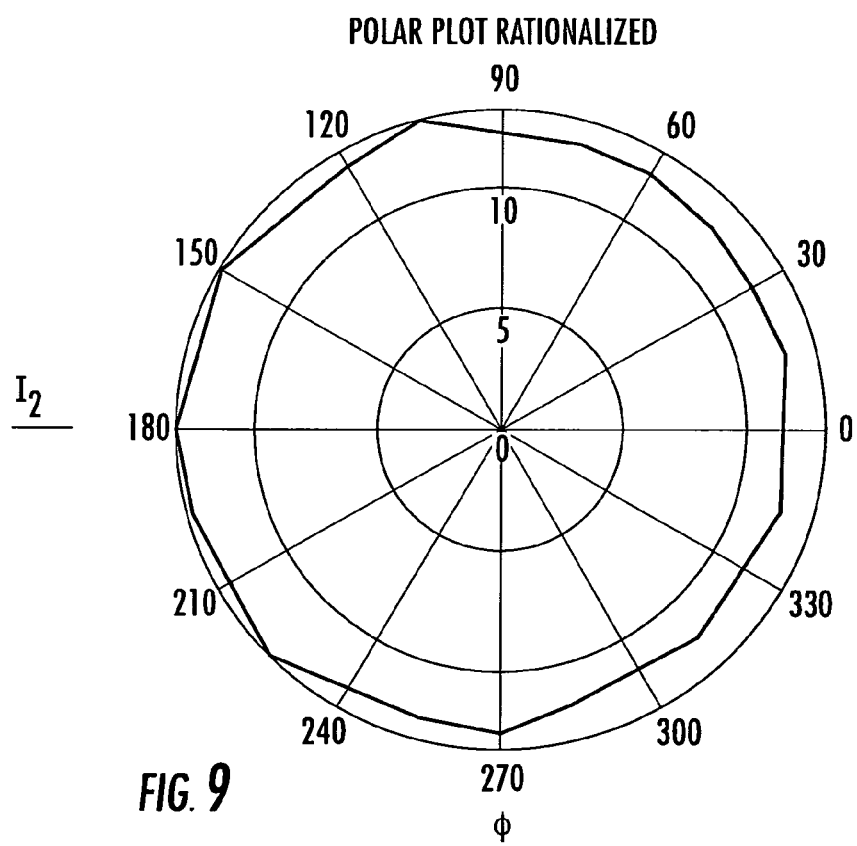
FIG. 9 is a graph showing the rationalized plot of FIG. 8 data.

The data from the first test (20 meter) was tabulated and plotted in a polar format below as later shown in the graph of FIG. 8. The angular dimension represents the stepwise progression of data points beginning with the nose of the aircraft at 0 degrees. The radial dimension represents the received RF power in dBm at 20 meter distance at the indicated angle. Due to this representation of data it may appear somewhat counterintuitive that the most distant points have reduced power readings. FIG. 9 corrects this perceptual preference and shows a rationalized polar plot of FIG. 8. That plot does not attempt to scale exactly the power readings, but show the relative amplitudes for comprehensibility. The tabulated data as reflected in FIGS. 8 and 9 are shown in the table below:

$$Ch1 := \begin{pmatrix} \text{0-deg} & 86.4 \\ \text{15-deg} & 83.37 \\ \text{30-deg} & 84.53 \\ \text{45-deg} & 84.03 \\ \text{60-deg} & 82.53 \\ \text{75-deg} & 83.03 \\ \text{90-deg} & 82.53 \\ \text{105-deg} & 77.03 \\ \text{120-deg} & 80.2 \\ \text{135-deg} & 81.53 \\ \text{150-deg} & 75.70 \\ \text{165-deg} & 77.03 \\ \text{180-deg} & 75.53 \\ \text{195-deg} & 77.2 \\ \text{210-deg} & 78.87 \\ \text{225-deg} & 75.53 \\ \text{240-deg} & 81.20 \\ \text{255-deg} & 82.37 \\ \text{270-deg} & 80.53 \\ \text{285-deg} & 86.03 \\ \text{300-deg} & 87.37 \\ \text{315-deg} & 85.37 \\ \text{330-deg} & 87.87 \\ \text{345-deg} & 83.53 \\ \text{360-deg} & 86.4 \end{pmatrix} *$$

$\phi := Ch1^{\langle 0 \rangle}$ $r := Ch1^{\langle 1 \rangle}$ $I_1 := (-Ch1)^{\langle 1 \rangle}$ $I_2 := \dfrac{1}{Ch1^{\langle 1 \rangle}}$ $I_2 := I_2 \cdot 1000$

|  |  | 0 |
|---|---|---|
| $I_1 =$ | 0 | −86.4 |
|  | 1 | −83.37 |
|  | 2 | −84.53 |
|  | 3 | −84.03 |
|  | 4 | −82.53 |
|  | 5 | −83.03 |
|  | 6 | −82.53 |
|  | 7 | −77.03 |
|  | 8 | −80.2 |
|  | 9 | −81.53 |
|  | 10 | −75.7 |
|  | 11 | −77.03 |
|  | 12 | −75.53 |
|  | 13 | −77.2 |
|  | 14 | −78.87 |
|  | 15 | −75.53 |

$$I_2 = \begin{array}{|cc|} \hline & 0 \\ \hline 0 & 11.574 \\ 1 & 11.995 \\ 2 & 11.83 \\ 3 & 11.901 \\ 4 & 12.117 \\ 5 & 12.044 \\ 6 & 12.117 \\ 7 & 12.982 \\ 8 & 12.469 \\ 9 & 12.265 \\ 10 & 13.21 \\ 11 & 12.982 \\ 12 & 13.24 \\ 13 & 12.953 \\ 14 & 12.679 \\ 15 & 13.24 \\ \hline \end{array}$$

The smooth nature of the curve depicted in FIGS. 8 and 9, with no extreme peaks or valleys, suggests either a large number of evenly distributed emitters on the fuselage of the aircraft, or alternatively, that the body or skin of the aircraft is the predominant source of the radiation. The conclusion that the body (skin) of the aircraft is the predominant source of radiation is reinforced by the small, uniform increase in amplitude in the rear hemisphere.

The RF field data from the second set of measurements for the close-in portion of the far field was plotted on a rectilinear graph based on a scaled image of the aircraft obtained from the manufacturer's maintenance manual. This transposition is shown above in FIG. 7. These data points were then incorporated in a 22 by 2 matrix, which provided a two dimensional representation of the area around the aircraft. The raw data for the non-zero matrix entries is shown below. The matrix subscripts are the x and y positions of the data point and the value of the matrix entry is the RF power expressed in dBm.

$Ch_{27,13} := -86.33$ $Ch_{23,16} := -81.17$ $Ch_{20,16} := -80.50$ $Ch_{17,17} := -87.67$ $Ch_{14,22} := -83.00$ $Ch_{12,26} := -80.67$ $Ch_{9,28} := -83.00$ $Ch_{8,23} := -76.00$ $Ch_{9,21} := -75.67$ $Ch_{10,18} := -75.67$ $Ch_{8,18} := -71.83$ $Ch_{5,16} := -64.50$ $Ch_{0,13} := -74.83$ $Ch_{5,10} := -68.17$ $Ch_{9,9} := -64.33$ $Ch_{9,7} := -71.17$ $Ch_{8,3} := -81.33$ $Ch_{8,0} := -83.67$ $Ch_{14,2} := -78.5$ $Ch_{16,6} := -81.67$ $Ch_{17,9} := -83.00$ $Ch_{22,9} := -79.50$

Figure 10:
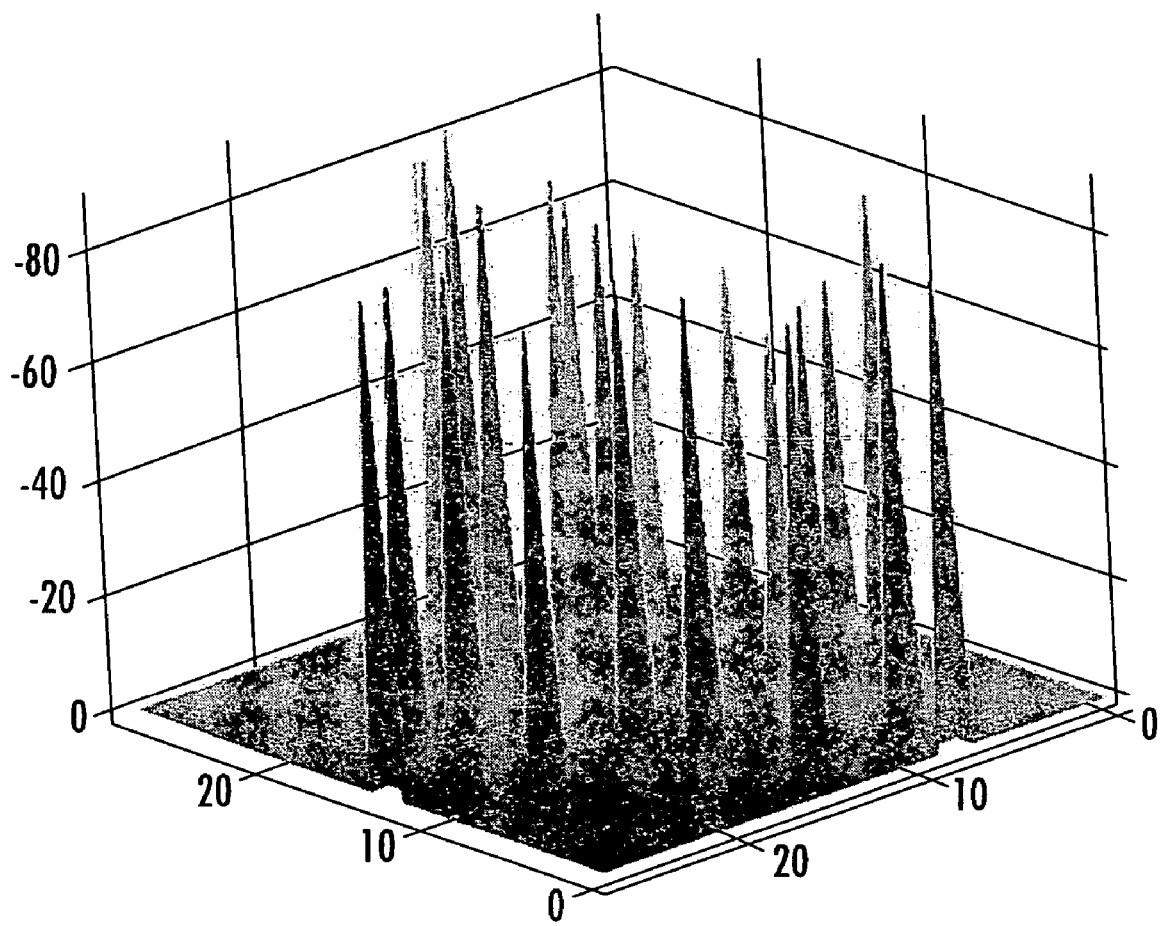
FIG. 10 is a three dimensional perspective view of the near-skin data collected by using the system of the present invention.
Figure 11:
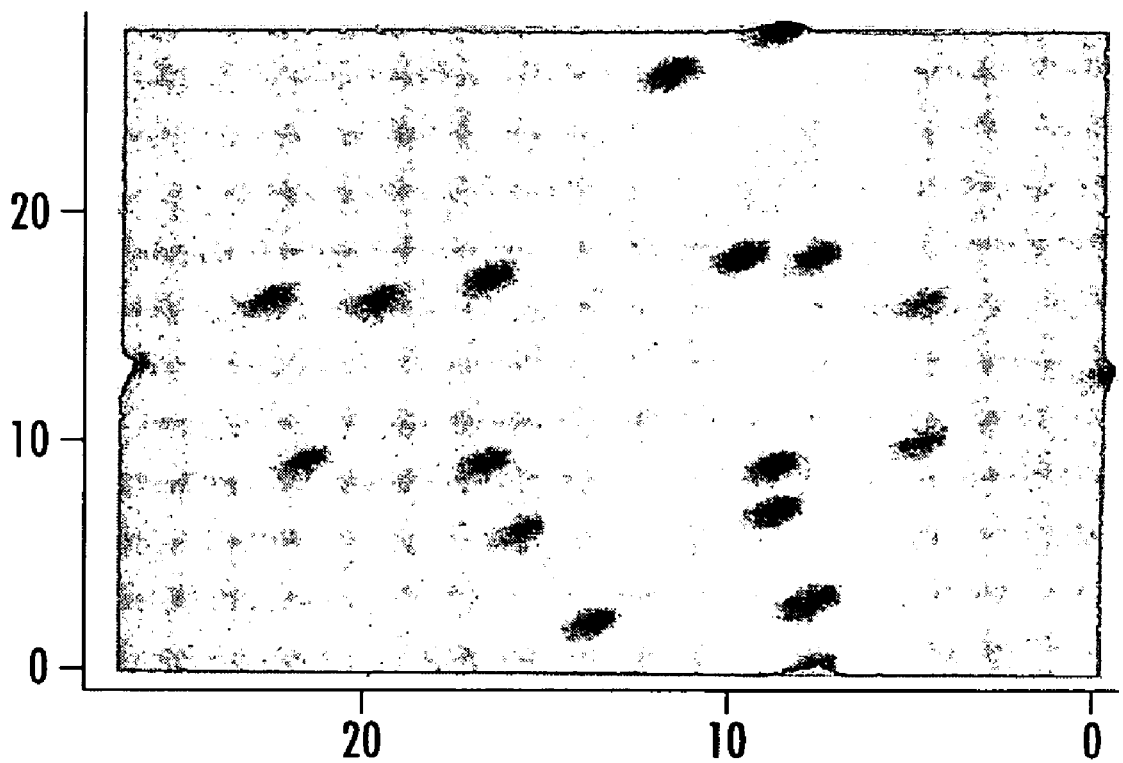
FIG. 11 is a plan view of the data shown in FIG. 10.

The data in this matrix has been plotted in a three dimensional representation, which is presented in two views. The first view shown in FIG. 10 as a three dimensional perspective view of the near-skin data to assist visualization of the field strength measurements in relation to the aircraft. The second view shown in FIG. 11 is a plan view of FIG. 10, which aids in helping to determine a reasonable accuracy of the data positioning and the aircraft orientation.

Figure 12:
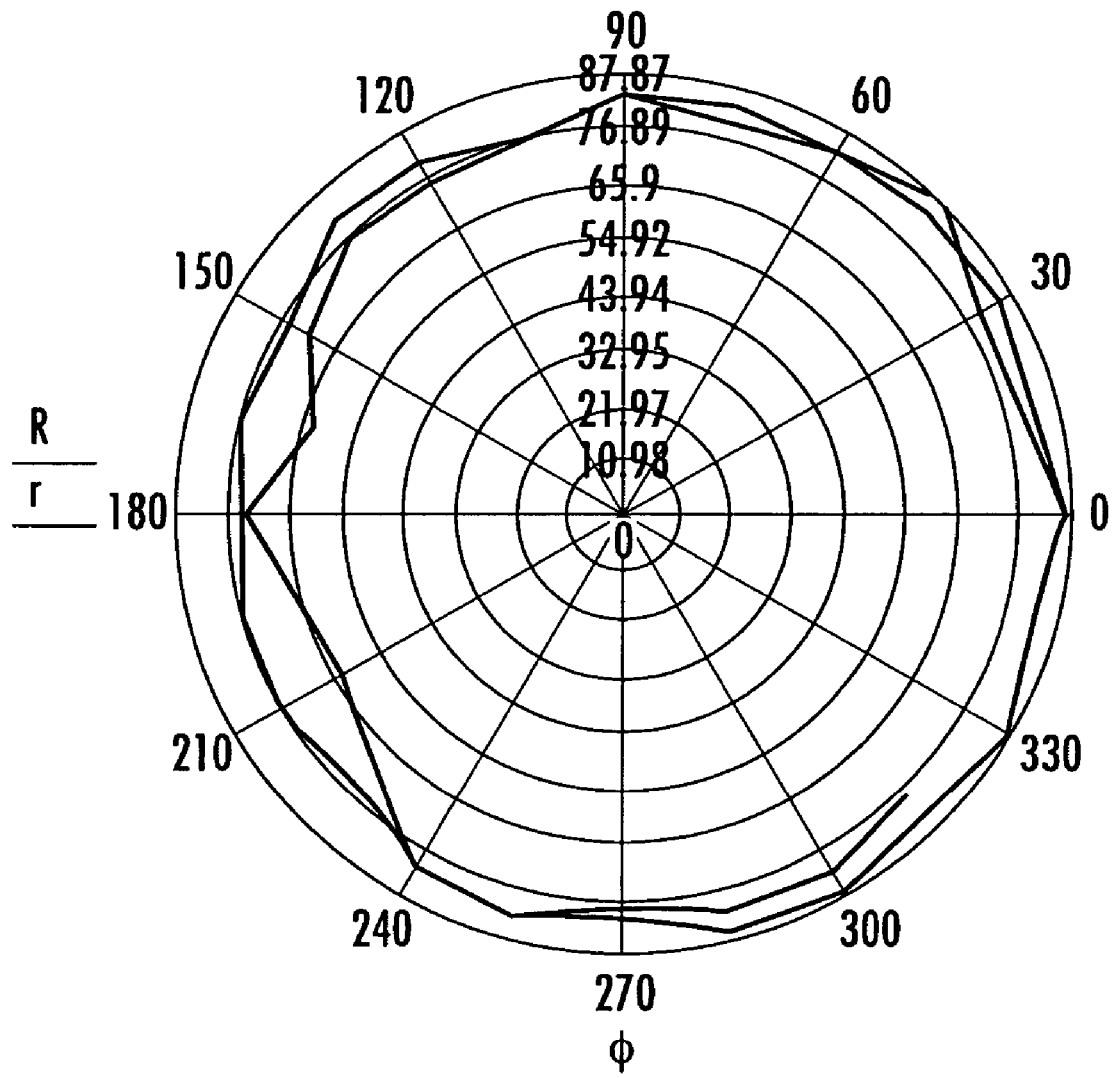
FIG. 12 is a graph showing a two-curved plot of the 20 meter and 2 meter data for comparison purposes.

Based upon these results, it was possible to create a direct comparison between the two field plots either mathematically, graphically or both. This was accomplished by converting the rectilinear coordinates of the near-skin plot to polar coordinates and plotting the data in two curves on one polar plot. Data for the results is shown below and a two curve plot of the 20 meter and 2 meter data for comparison purposes is shown in FIG. 12 for comparison purposes.

$$V := \begin{pmatrix} 13.5 & 0.0 \\ 10 & 2.8 \\ 6.5 & 3.5 \\ 4.25 & 3.5 \\ 1.25 & 9.0 \\ -0.5 & 12.5 \\ -3.5 & 14.5 \\ -5.2 & 10.3 \\ -4.0 & 7.5 \\ -2.8 & 4.8 \\ -4.8 & 4.8 \\ -8.25 & 2.8 \\ -12.8 & 0.0 \\ -8.25 & -3.0 \\ -4.0 & -4.25 \\ -4.0 & -5.75 \\ -5.25 & -10.0 \\ -5.25 & -13.25 \\ 1.25 & -11.25 \\ 3.00 & -7.0 \\ 4.25 & -4.25 \\ 9.0 & -4.25 \end{pmatrix}$$

$$P := \begin{pmatrix} 86.33 \\ 81.17 \\ 80.50 \\ 87.67 \\ 83.00 \\ 80.67 \\ 83.00 \\ 76.00 \\ 75.67 \\ 75.67 \\ 71.83 \\ 64.5 \\ 74.83 \\ 68.17 \\ 64.33 \\ 71.17 \\ 81.33 \\ 83.67 \\ 78.5 \\ 81.67 \\ 83.00 \\ 79.5 \end{pmatrix}$$

i := 0, 1 ... 21 j := 0 ... 1

$R_i := P_i$

In FIG. 12 and in the data represented above, the quantities i and j are indices for the polar data plot and the change of variable from P to R is for convenience. The function φ1 and "angle( )" create a set of angular coordinates from a pair of rectilinear coordinates by returning the angle from the positive x axis of the coordinate pair. This function operates from 0 to 2n. The radial coordinates are in dBm from zero at the origin to 87.87 dBm at the periphery. As before, the dBm are actually −dB from the value at the transmitter.

$\phi 1_i := \text{angle}[(V^{\langle 0 \rangle})_i, (V^{\langle 1 \rangle})_i]$ The two curves indicate the possible mechanisms for the RF radiation pattern from the aircraft. Certain points of interest are: (a) neither curve exhibits significant variability as would be the case if the sources were a small number of discreet emission sources; (b) the two curves almost overlay one another forward of the wing area, the region farthest from the internal RF source. They are not grossly divergent aft of the wing area; and (c) the power level of the radiation is not decreasing at the rate of a point source, i.e., $1/r^2$, it is more like the emission from a line source, $1/r$.

Two credible mechanisms to explain the RF radiation patterns are: (1) a large number of discreet emitters distributed fairly uniformly around the aircraft; or (2) the excitation of the aircraft skin with concomitant radiation of a uniform nature, tailing off only as a result conduction losses in the skin as the surface wave moves from the source area aft to the forward area. A third possibility is, of course, a combination of these two mechanisms.

The possibility of discrete sources distributed over the aircraft skin was explored and discarded. Two areas of possible strong radiation from openings were also examined to determine if any fuselage opening account for the strength of RF emissions. The cockpit windows and the louvered hatch into the aft equipment bay containing the laptop was examined. Placing the antenna directly in front of the cockpit window produced no change in the measured field as compared to 2 or 20 meters directly forward of the nose. A double layer of metalized mylar sheeting was placed over the louvers in the aft hatch and prior readings were repeated. An approximately 1 dB drop in received power level was observed.

The relatively smooth and similar measurements at the two distances indicate a reasonably uniform source for the radiated energy, both by way of the lack discontinuities and from the lack of a $1/r^2$ behavior of the power readings.

Figure 13:
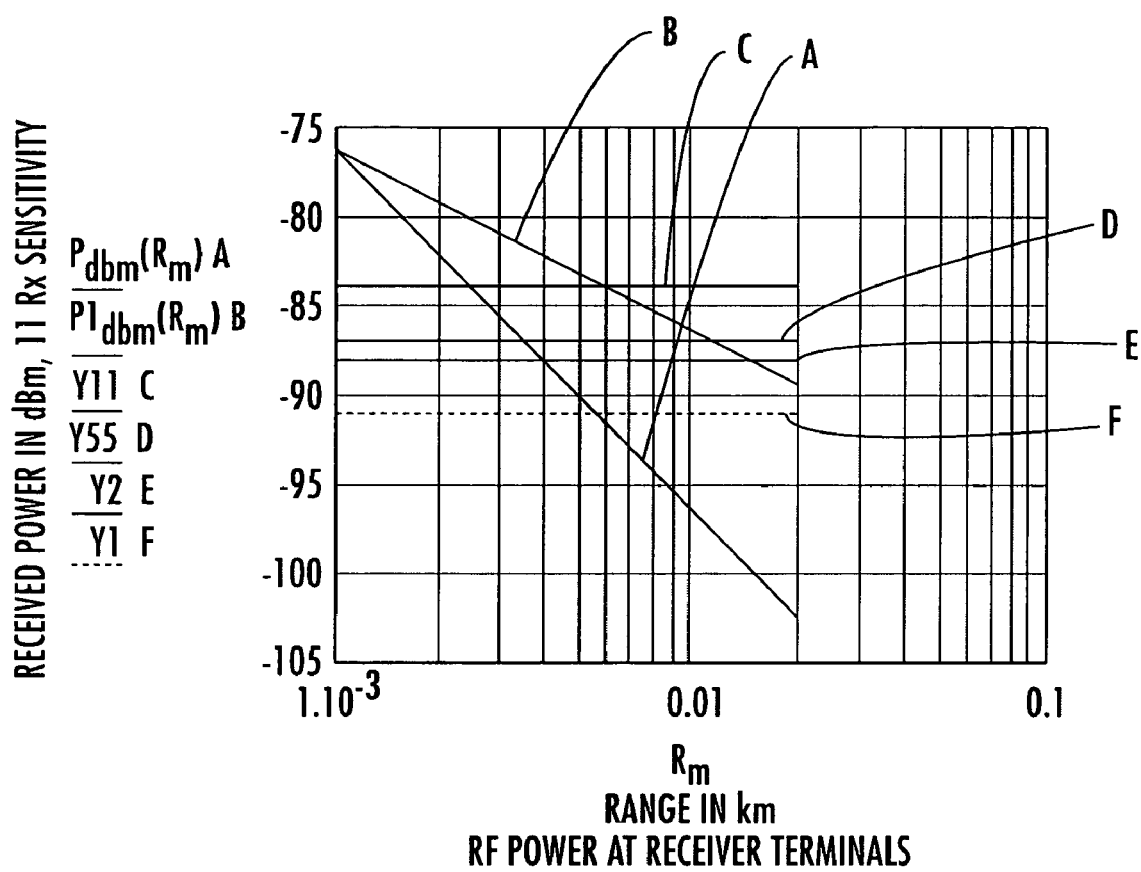
FIG. 13 is a graph showing the representation of 1/r and $1/r^2$ power roll off as a function of distance.

The field from an infinite conducting plate does not fall off as a function of distance. If two opposing edges of the plate are brought together to form an infinitely long conducting line, the power falls of as $1/r$, and further, that if the ends of the line are shrunk down to point, then the power falls off as $1/r^2$. This is illustrated in FIG. 13, which has been constructed to reflect the measurements obtained from the aircraft. FIG. 13 is a graph representative of $1/r$ and $1/r^2$ power roll off as a function of distance. One line is $1/r^2$ and another line is $1/r$. The horizontal lines represent the nominal sensitivity of the wireless NIC at the indicated data rates. It should be noted that the $1/r$ curve appears to fit the measured data more closely than the other curve.

The minor extrapolation of the curve to aircraft skin surface shows a source strength of −35 dBm. The actual source inside the aircraft is generating approximately +15 dBm, and thus, it appears that there is a 50 dB loss in coupling to the skin, which is a reasonable number. Based on the available data and this informal ad hoc measurement methodology, it is not unreasonable to assume that the aircraft is a combination finite line and, to a lesser degree, a finite curved surface emitter which would allow prediction of the behavior of other aircraft models and types.

These measurements make it clear that a broadband, digital communication system can be installed in the avionics bay of any aircraft and, without having to mount external antenna, communicate reliably with the terminal offices at operationally useful distances. Some experiments were also conducted on several different models of commercial aircraft to begin answering some of these tests involved placing a laptop within the avionics bay of different aircraft, closing up the aircraft and, using a second laptop, determine the distance away from the fuselage that the external computer could continue to communicate with the internal one. In general, it was found that this could be accomplished at a distance of 60 to 90 m with reasonable data rates. However, the coupling mechanism of the energy from one computer to the other through the aircraft's skin was not understood sufficiently to proceed with assertions that this was operationally feasible for a wide range of aircraft types and models. This concern generated the above data collection and analysis.

Based on the data collected and heuristic analysis, the energy is coupled from free space propagation into the skin of the aircraft which then re-radiates the energy after an attendant propagation and/or conduction loss. This loss, measured at any given point in the radiation pattern close to the aircraft skin, is typically on the order of 40 to 50 dB from the source power level.

In predicting the available RF power at any given operationally useful range, the aircraft can be viewed as a collection of line radiators. This is a conservative, but reasonable conclusion. A subsidiary conclusion is that the field will be fairly uniform in the forward hemisphere of the aircraft. This tentative conclusion is based on an aft placement of the RF source.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A method of transmitting aircraft data comprising:
    acquiring data within a memory of a PC card comprising a PC card body having a PCMCIA form factor and that is interfaced with an aircraft component;
    retrieving the aircraft data from the memory based on commands received from a processor contained within the PC card; and
    transmitting the retrieved aircraft data from a transmitter contained within the PC card along a radio frequency signal and passively coupling RF energy into the skin of the aircraft, which is operative as a passive radiator to re-radiate the radio frequency communications signal to a location remote from the aircraft such that the RF communications signal is transmitted without use of a separate antenna mounted on the aircraft.

2. A method according to claim 1, which further comprises interfacing the PC card to the aircraft component using a PCMCIA slot.

3. A method according to claim 1, wherein the aircraft data comprises flight performance data.

4. A method according to claim 1, wherein the aircraft data comprises aircraft engine data.

5. A method according to claim 1, wherein the aircraft data comprises in-flight entertainment data.

6. A method according to claim 1, wherein the aircraft data is related to at least one of aircraft contents, passenger data, aircraft departure and arrival, passenger transactions, or data from a sky marshall.

7. A method according to claim 1, which further comprises collecting aircraft data from a Data Acquisition Unit (DAU).

8. A method according to claim 1, which further comprises transmitting the aircraft data over a spread spectrum communications signal.

9. A method according to claim 8, which further comprises transmitting the aircraft data over a frequency hopping spread spectrum communications signal.

10. A method according to claim 8, which further comprises transmitting the aircraft data over a direct sequence spread spectrum communications signal.

11. A method according to claim 1, which further comprises transmitting the aircraft data to a Central Maintenance Display Unit (CMDU) indicating in real-time the health and status of aircraft systems.

12. A PC card that interfaces with an aircraft component for transmitting aircraft data received from the aircraft component comprising:
    a PC card body having a PCMCIA form factor;
    a PC card interface adapted for connecting to an aircraft component;
    a memory for storing aircraft data received from the aircraft component;
    a radio transmitter for receiving aircraft data from the memory and transmitting the aircraft data over a radio frequency signal and passively coupling RF energy into the skin of the aircraft, which is operative as a passive radiator to re-radiate the radio frequency communications signal to a location remote from the aircraft such that the RF communications signal is transmitted without use of a separate antenna mounted on the aircraft;
    a processor operatively connected to the PC card interface, memory and radio transmitter for reading and forwarding data from memory to the radio transmitter; and
    a logic circuit operative with the memory, processor and PC card interface for controlling the downloading of data from the aircraft component to the memory and the reading and forwarding of data from the memory to the radio transmitter without conflict between the processor and aircraft component.

13. A PC card according to claim 12, wherein said logic circuit comprises a field programmable gate array.

14. A PC card according to claim 12, wherein said transmitter comprises a spread spectrum transmitter for transmitting aircraft data over a spread spectrum communications signal.

15. A PC card according to claim 14, wherein said transmitter is operative for transmitting said spread spectrum communications signal over a frequency hopping spread spectrum communications signal.

16. A PC card according to claim 14, wherein said transmitter is operative for transmitting said spread spectrum communications signal over a direct sequence spread spectrum communications signal.

17. A PC card that interfaces with an aircraft component for transmitting aircraft data received from the aircraft component comprising:
    a PC card body having a PCMCIA form factor;
    a PC card interface adapted for connecting to the aircraft component;
    a memory for storing aircraft data received from the aircraft component;
    a radio transceiver for receiving aircraft data from the memory and transmitting the aircraft data over a radio frequency communications signal and passively coupling RF energy into the skin of the aircraft, which is operative as a passive radiator and to re-radiate the radio frequency communications signal to a location remote from the aircraft such that the RF communications signal is transmitted without use of a separate antenna mounted on the aircraft, and receiving data over a radio frequency communications signal for onboard processing;
    a processor operatively connected to the PC card interface, memory and radio transmitter for reading and forwarding data from memory to the radio transmitter and controlling receipt of data for onboard processing; and
    a logic circuit operative with the memory, processor and PC card interface to aid in controlling the downloading of data from the aircraft component to the memory, and the reading and forwarding of data from the memory to the radio transmitter without conflict between the processor and aircraft component.

18. A PC card according to claim 17, wherein said logic circuit comprises a field programmable gate array.

19. A PC card according to claim 17, wherein said transceiver comprises a spread spectrum transceiver for transmitting and receiving data over a spread spectrum communications signal.

20. A PC card according to claim 19, wherein said transceiver is operative for transmitting and receiving said spread spectrum communications signal over a frequency hopping spread spectrum communications signal.

21. A PC card according to claim 20, wherein said transceiver is operative for transmitting and receiving said spread spectrum communications signal over a direct sequence spread spectrum communications signal.

22. A PC card according to claim 17, wherein said transceiver is operative for receiving data for transfer to an aircraft component via the PC card interface.

23. A PC card according to claim 17, wherein said transceiver is operative for receiving and transmitting the data using the radio transmitter.

* * * * *